(12) United States Patent
Dai et al.

(10) Patent No.: US 8,248,772 B2
(45) Date of Patent: Aug. 21, 2012

(54) ELECTRONIC DEVICE

(75) Inventors: Lung Dai, Taipei Hsien (TW);
Guang-Jin Li, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 218 days.

(21) Appl. No.: 12/709,515

(22) Filed: Feb. 22, 2010

(65) Prior Publication Data

US 2011/0141679 A1 Jun. 16, 2011

(30) Foreign Application Priority Data

Dec. 15, 2009 (CN) .......................... 2009 1 0311450

(51) Int. Cl.
*G06F 1/16* (2006.01)
(52) U.S. Cl. .................................................. 361/679.02
(58) Field of Classification Search ............. 361/679.02, 361/679.27
See application file for complete search history.

(56) References Cited

U.S. PATENT DOCUMENTS

| | | | | |
|---|---|---|---|---|
| 5,103,376 A * | 4/1992 | Blonder | ................... | 361/679.09 |
| 5,168,426 A * | 12/1992 | Hoving et al. | ........... | 361/679.09 |
| 5,200,913 A * | 4/1993 | Hawkins et al. | ......... | 361/679.09 |
| 5,276,589 A * | 1/1994 | Bartlett et al. | ........... | 361/679.06 |
| 5,481,430 A * | 1/1996 | Miyagawa et al. | ...... | 361/679.09 |
| 5,548,478 A * | 8/1996 | Kumar et al. | ............ | 361/679.27 |
| 5,644,469 A * | 7/1997 | Shioya et al. | ............ | 361/679.06 |
| 6,128,186 A * | 10/2000 | Feierbach | ................ | 361/679.27 |
| 6,381,125 B1 * | 4/2002 | Mizoguchi et al. | ...... | 361/679.08 |
| 6,480,374 B1 * | 11/2002 | Lee | .......................... | 361/679.17 |
| 6,636,419 B2 * | 10/2003 | Duarte | .................... | 361/679.09 |
| 6,700,773 B1 * | 3/2004 | Adriaansen et al. | ..... | 361/679.08 |
| 6,980,420 B2 * | 12/2005 | Maskatia et al. | ......... | 361/679.57 |
| 7,599,181 B2 * | 10/2009 | Chuang et al. | .......... | 361/679.55 |
| 8,050,030 B2 * | 11/2011 | Wu et al. | .................. | 361/679.58 |
| 2010/0027207 A1 * | 2/2010 | Jin et al. | ................... | 361/679.21 |
| 2010/0103603 A1 * | 4/2010 | Wu et al. | .................. | 361/679.05 |
| 2010/0259872 A1 * | 10/2010 | Yang et al. | ............... | 361/679.01 |
| 2011/0051327 A1 * | 3/2011 | Yang et al. | ............... | 361/679.01 |
| 2011/0157802 A1 * | 6/2011 | Li | ............................ | 361/679.02 |

* cited by examiner

*Primary Examiner* — Lisa Lea Edmonds
(74) *Attorney, Agent, or Firm* — Altis Law Group, Inc.

(57) ABSTRACT

An electronic device includes a cover, a body, and two sliding members. The body defines two sliding slots. Each sliding slot includes a first portion, and a second portion opposite to the first portion. The two sliding members are pivotally coupled to the cover and are slidably received in the two sliding slots. The cover is rotatably and slidably coupled to the body by the two sliding members engaging with the two sliding slots, and is capable of sliding along the two sliding slots from the first portion to the second portion.

17 Claims, 7 Drawing Sheets

ELECTRONIC DEVICE

BACKGROUND

1. Technical Field

The disclosure generally relates to electronic devices, and particularly, to a portable touch-sensitive display device.

2. Description of Related Art

Conventional access to the touch-sensitive display and keyboard is to flip open the touch-sensitive display for access to the display and keyboard. This is an inconvenience. Therefore, there is room for improvement in the art.

BRIEF DESCRIPTION OF THE DRAWINGS

The components of the drawings are not necessarily drawn to scale, the emphasis instead being placed upon clearly illustrating the principles of the embodiments of an electronic device. Moreover, in the drawings, like reference numerals designate corresponding parts throughout several views.

DETAILED DESCRIPTION

Figure 1:
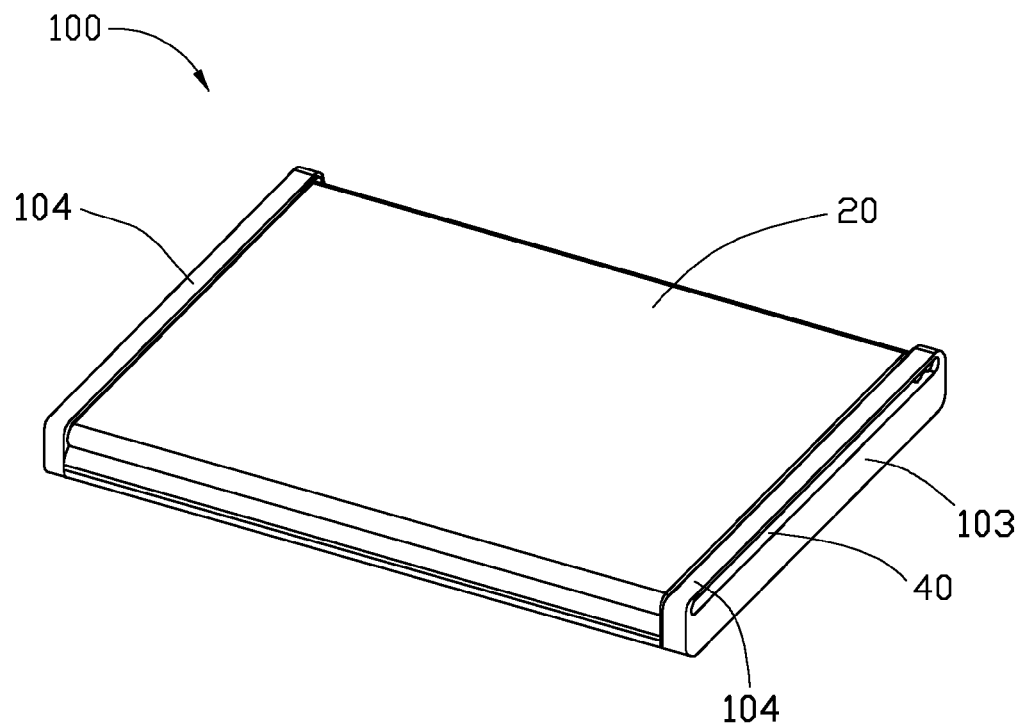
FIG. 1 is a perspective view of an electronic device used in a first fashion and in a second fashion in accordance with one embodiment.
Figure 2:
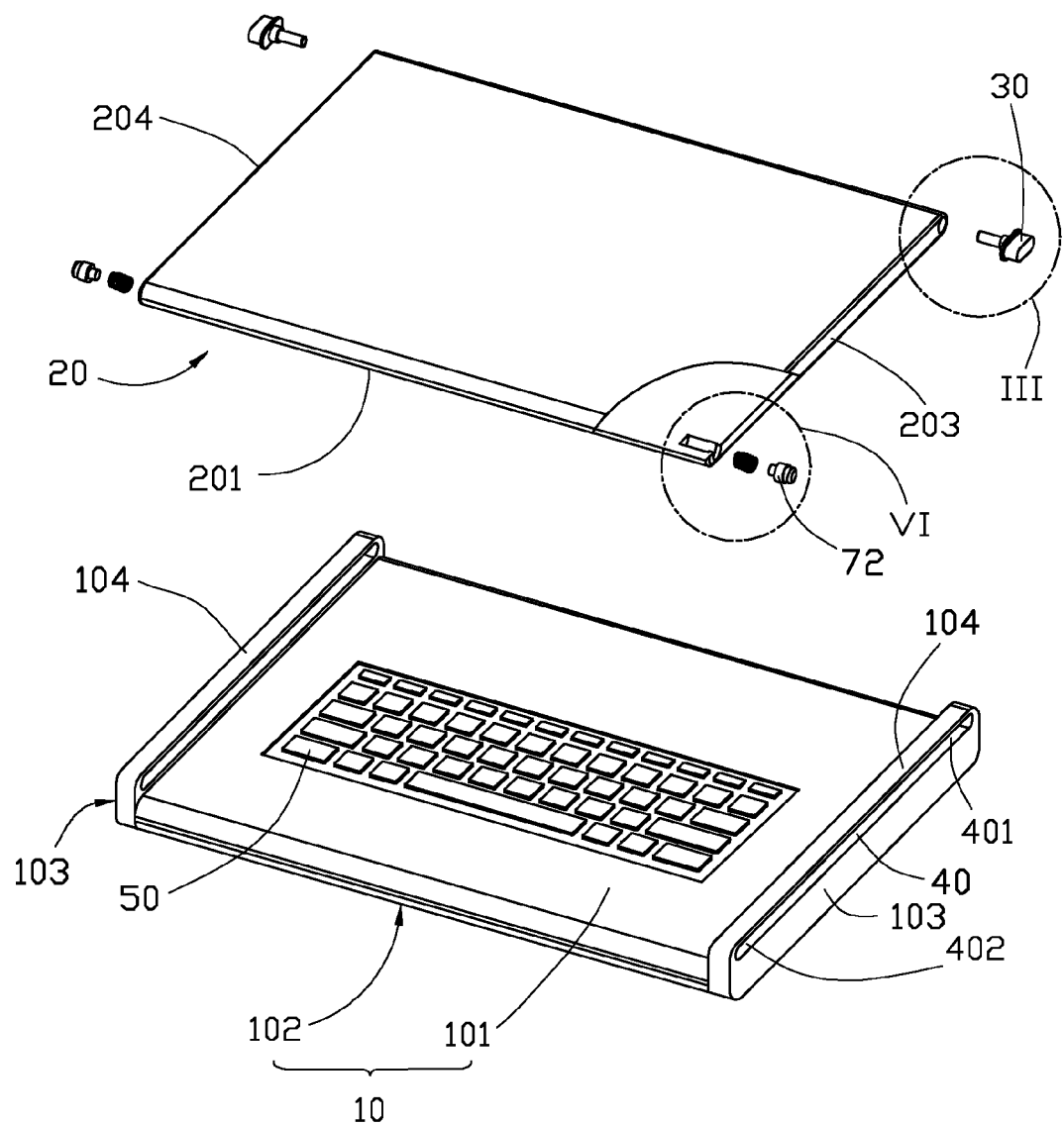
FIG. 2 is an exploded view of the electronic device of FIG. 1.

Referring to FIGS. 1-2, a portable electronic device 100 is shown. The portable electronic device 100 includes a body 10, a cover 20, and two sliding members 30. The cover 20 is rotatably and slidably coupled to the body 10 via the two sliding members 30.

The body 10 includes an upper surface 101, a bottom surface 102, two planar sidewalls 103, and two sliding rails 104. The planar sidewalls 103 are perpendicular to the upper surface 101 and the bottom surface 102. The two sliding rails 104 are arranged at two rims of the upper surface 101 adjacent to the planar sidewalls 103. The two rims are on opposite sides of the upper surface 101. Two elongated sliding slots 40 are defined between the two sliding rails 104 and the upper surface 101 correspondingly. Each elongated sliding slot 40 includes a first portion 401 and a second portion 402. The first portion 401 and the second portion 402 are arranged at two opposite ends of the elongated sliding slot 40.

An input device 50 is fixed to the upper surface 101 of the body 10. The input device 50 is configured to receive user inputs. In the embodiment, the input device 50 is a keyboard.

Figure 6:
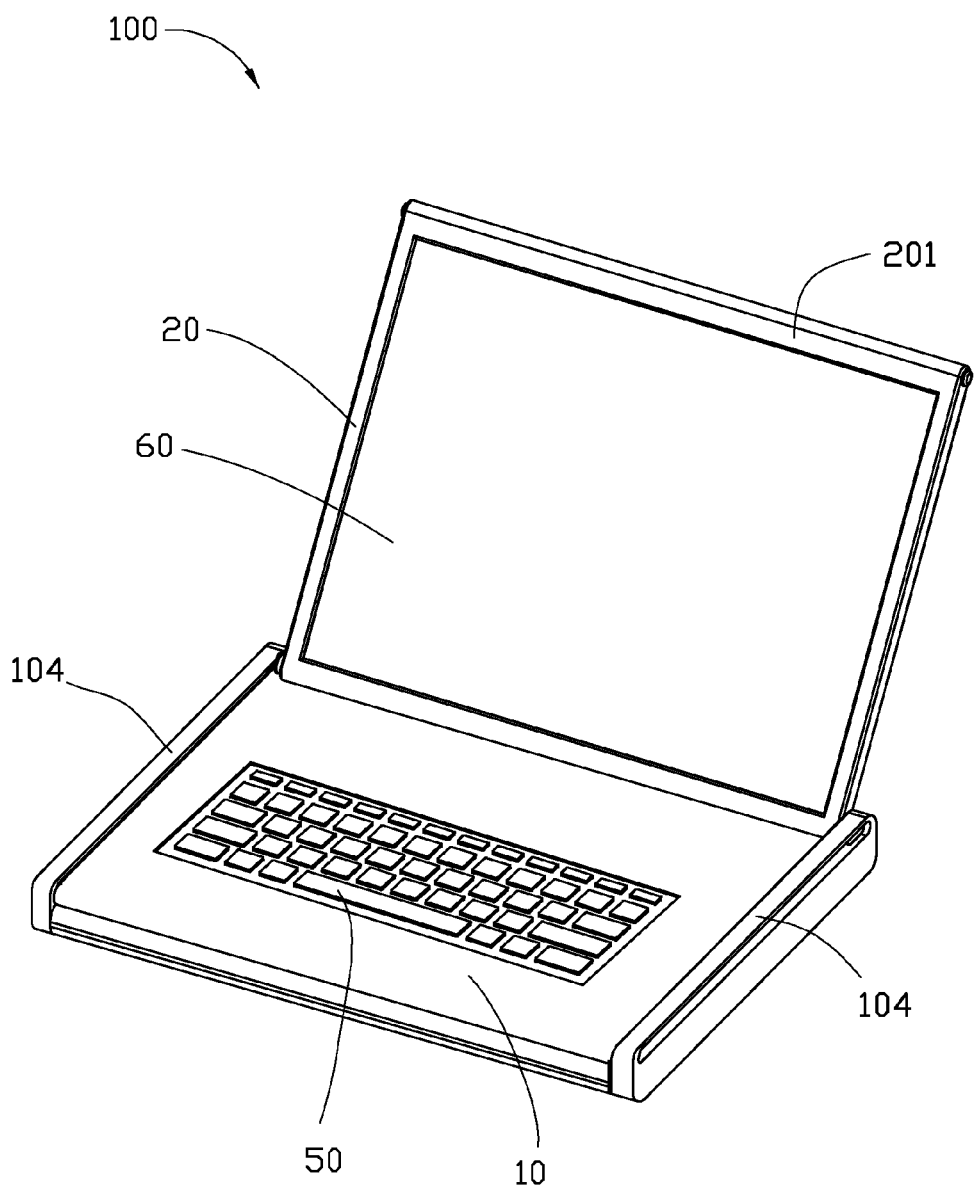
FIG. 6 is a perspective view of the electronic device of FIG. 1, when the electronic device is used in the first fashion.

The cover 20 includes a first surface 201, and a second surface 202. The first surface 201 is substantially parallel to the second surface 202. Referring to FIG. 6, a display 60 is fixed to the first surface 201. In the embodiment, the display 60 is a touch-sensitive display.

The cover 20 further includes two side surfaces 203, 204. The first and second surfaces 201, 202 are perpendicular to the side surfaces 203, 204. Two sliding members 30 are pivotally coupled to the two side surfaces 203, 204, respectively. Two latching members 72 are mounted to the side surfaces 203, 204, respectively. The two latching members 72 and the two sliding members 30 are disposed at opposite ends of the side surfaces 203, 204 correspondingly.

Figure 3:
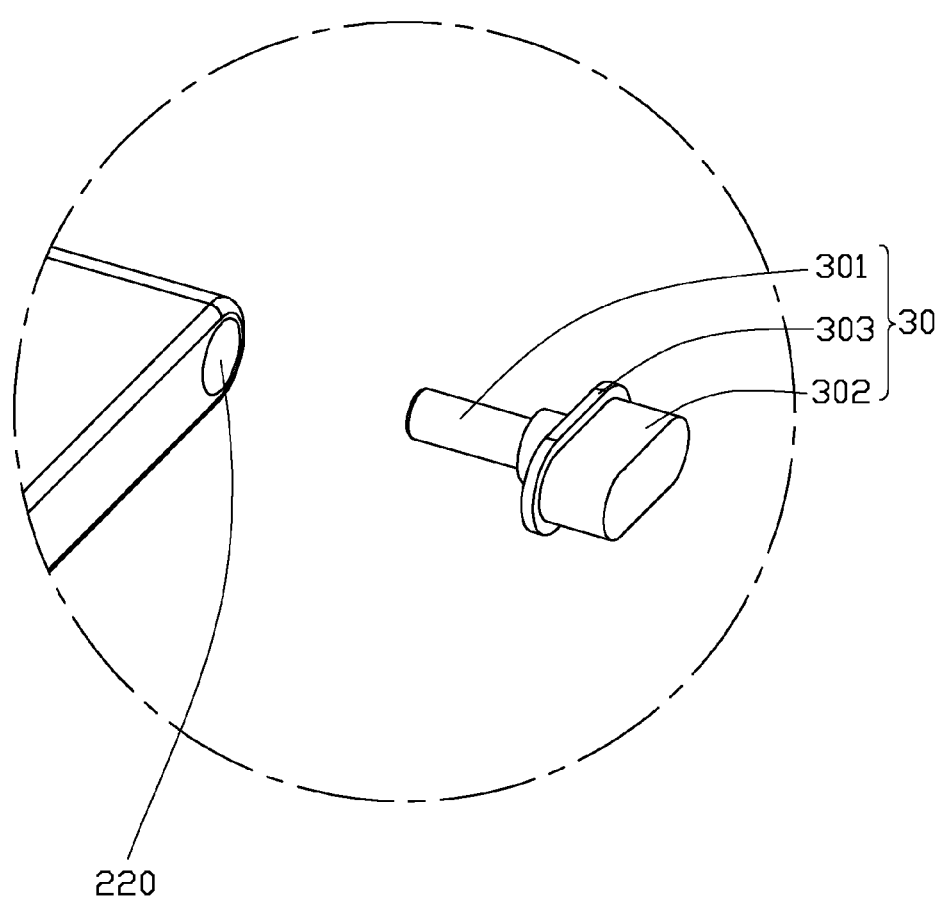
FIG. 3 is an enlarged sectional view of portion III in the electronic device shown in FIG. 2.
Figure 4:
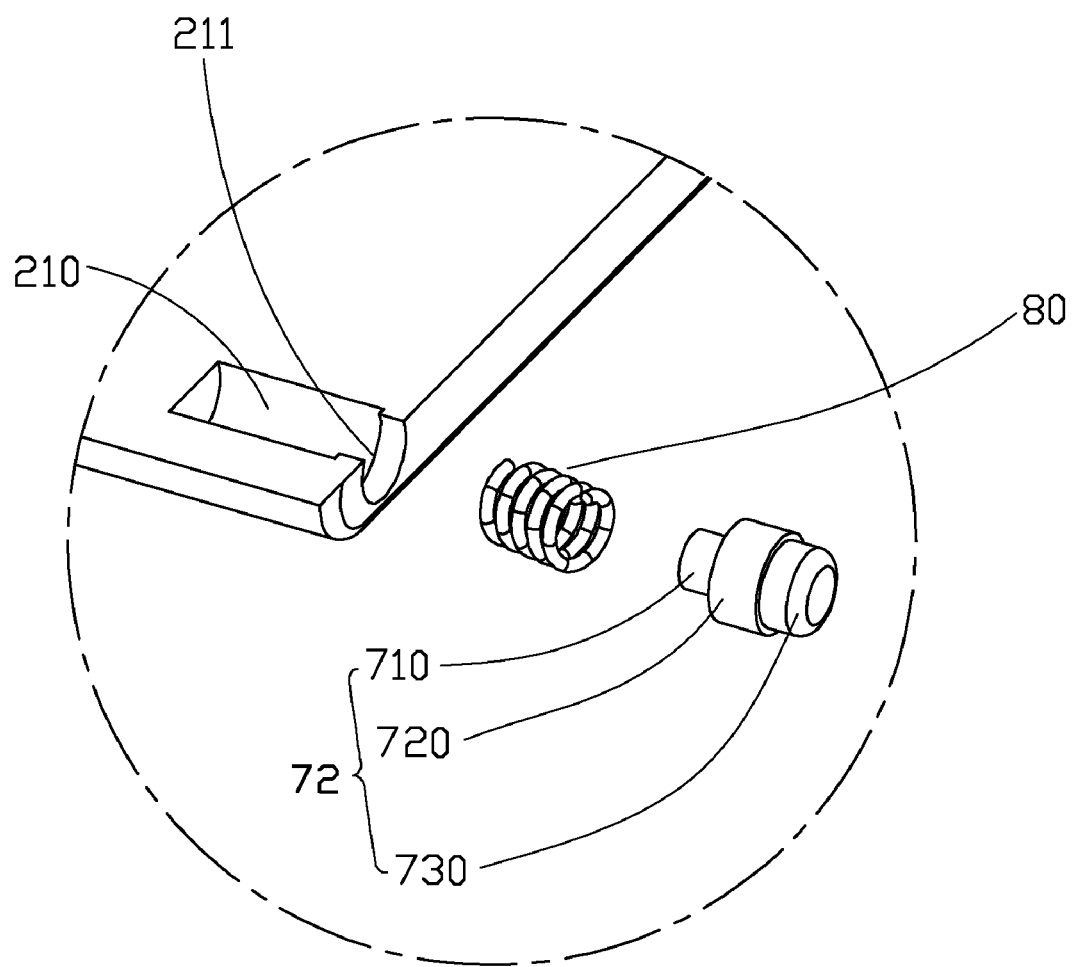
FIG. 4 is an enlarged sectional view of portion VI in the electronic device shown in FIG. 2.

Referring also to FIGS. 3-4, one end of the side surface 203 defines a round hole 220. The other end of the side surface 203 defines a through hole 211. The cover 20 further defines two tubular recesses 210 at opposite sides of the round hole 220. The tubular recesses 210 communicate with the through holes 211 correspondingly. The tubular recesses 210 are configured to receive the latching members 72. The round holes 220 are configured to receive the sliding members 30.

The sliding member 30 includes a pivot rod 301, a guiding post 302, and an elliptic limiting portion 303. The limiting portion 303 joins the pivot rod 301 to the guiding post 302. The pivot rod 301 and the guiding post 302 are perpendicular to the limiting portion 303. The guiding post 302 is substantially elliptic. The pivot rod 301 is rotatably received in the round hole 220, such that the sliding member 30 is rotatable relative to the cover 20. The width of the limiting member 303 is wider than that of the sliding slot 40. The width of the guiding post 302 is slightly narrower than that of the sliding slot 40. It should be noted that in assembly, when the pivot rod 301 engages with the round hole 220, a desired force of sliding friction is achieved, such that the cover 20 can remain at a desired angular position relative to the body 10.

The latching member 72 includes a columnar post 710, a columnar connecting post 720, and a columnar latching post 730. The diameter of the columnar connecting post 720 is larger than that of the columnar latching post 730. The diameter of the through hole 211 is slightly larger than that of the latching post 730 but is smaller than that of the connecting post 720.

The portable electronic device 100 further includes two elastic elements 80. The elastic elements 80 are received in the tubular recesses 210 correspondingly. In the embodiment, the elastic elements 80 are spiral springs. The diameter of the elastic element 80 is larger than that of the through hole 211. The length of the elastic element 80 is slightly less than that of the round recess 210. It should be noted that in assembly, the elastic element 80 is sleeved on the columnar post 710, the columnar post 710 and the connecting post 720 are accommodated in the round recess 210, and the latching post 730 extends from the through hole 211 when the latching post 730 is at rest. The latching post 730 is inserted in the through hole 211 and the connecting post 720 presses the elastic element 80 when the latching post 730 is pressed.

In assembly, the sliding members 30 are rotatably coupled to the cover 20 by inserting the pivot rods 301 in the round holes 220 correspondingly. The guiding posts 302 of the sliding members 30 are received in the sliding slots 40, such that the cover 20 is sandwiched between the two sliding rails 106, and is slidable relative to the sliding slots 40.

After assembly, because the limiting portion 303 is perpendicular to the guiding post 302, and the width of the limiting member 303 is larger than that of the sliding slot 40, the cover 20 is slidable in a parallel direction to the sliding slots 40. Because the latching posts 730 are extendable from, and penetrable in the through hole 211, the cover 20 is latched to the body 10 while the latching posts 730 extends from the through holes 211 and are sandwiched between the sliding slots 40, and is unlatched from the body 10 while the latching posts 730 are inserted in the through hole 211.

Figure 5:
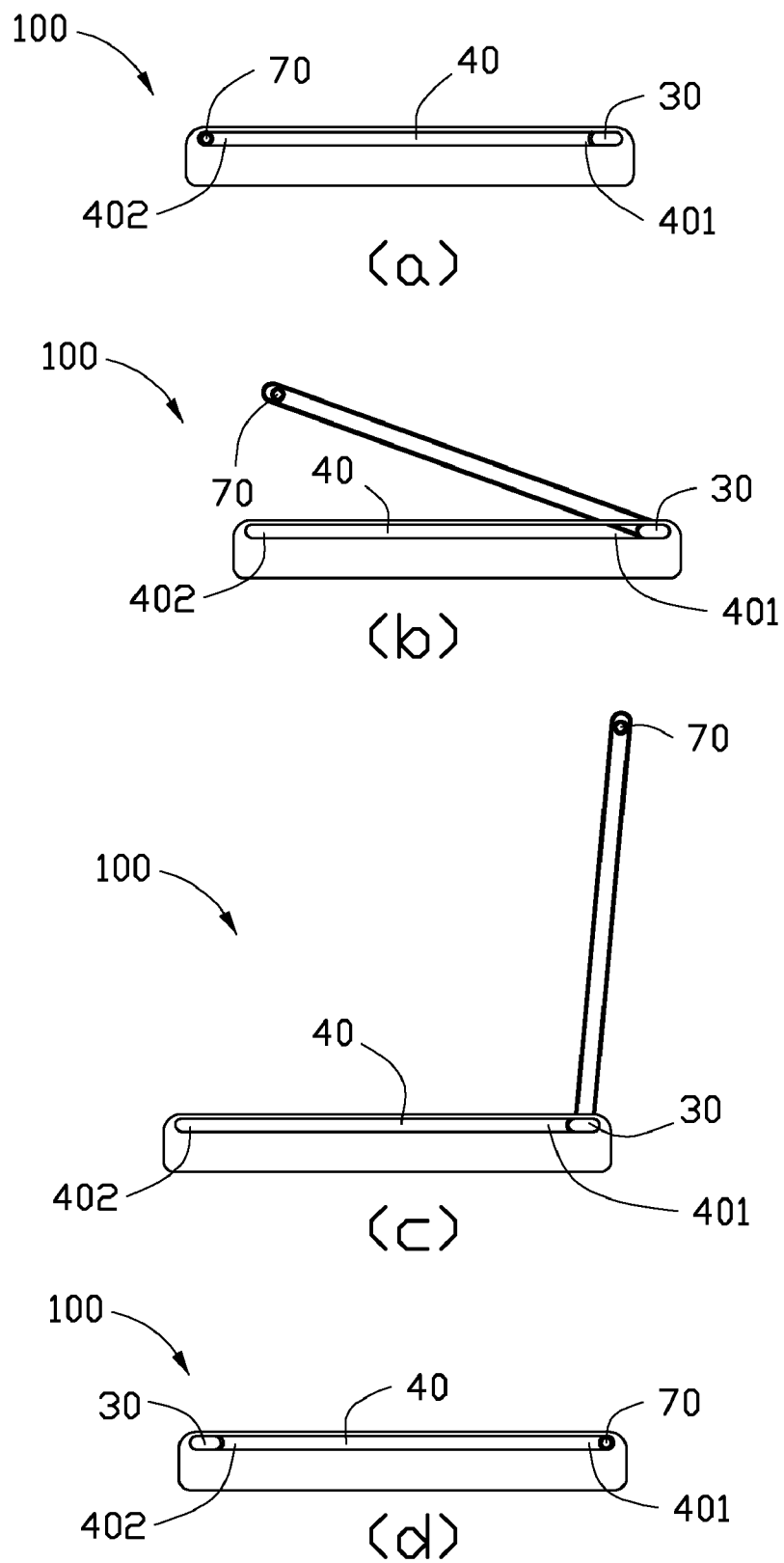
FIG. 5 is an explanatory view showing four states of the electronic device of FIG. 1 in use.

Referring to FIGS. 1 and 5(a), the portable electronic device 100 is shown in a locked state. In the locked state, the sliding members 30 are disposed at the first portion 401 of the sliding slot 40. The latching members 72 are disposed at the second portion 402, the latching posts 730 extend from the through holes 211 and are received in the sliding slots 40 correspondingly. The cover 20 is latched to the body 10 and the first surface 201 of the cover 20 faces the body 10, such that the display 60 fixed to the cover 20 is protected.

Referring to FIGS. 5(b), 5(c) and 6, the cover 20 is unlatched from the body 10 by operating the latching member 70, as a result, the cover 20 is rotatably flipped opened, and the electronic device 100 is used in a foldable fashion. When the electronic device 100 is used in a foldable fashion, the display 60 is used as a display device, and the input device 112 is used to receive user input operation.

Figure 7:
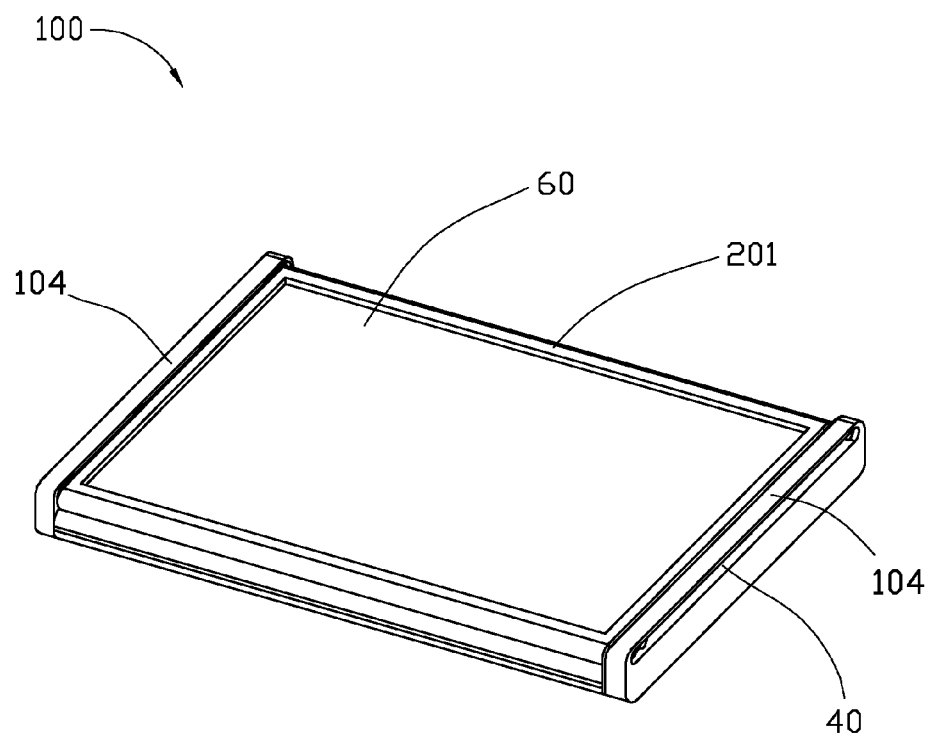
FIG. 7 is a perspective view of the electronic device of FIG. 1, when the electronic device is used in the second fashion.

Referring to FIGS. 5(c), 5(d) and 7, the sliding members 30 slide along the sliding slots 40 from the first portion 401 to the second portion 402. When the cover 20 slides to the second portion 402, the cover 20 is rotated to latch the latching member 72 at the first portion 401 away from the second portion 402, such that the cover 20 folds over on the body 10 again with the display 60 exposed. As a result, the electronic device 100 can be used in a panel fashion, and the display 60 is operated as an input device to receive touch inputs and also as an output device to display information.

When not in use, the sliding member 30 of the electronic device 100 is movable to the first portion of the sliding slots 40, away from the second portion 402. The latching member 72 is then latched to the cover 20 and to the sliding slots 40 at the second portion 402, thereby shielding and protecting the display 60.

Although the present disclosure has been specifically described on the basis of the embodiments thereof, the disclosure is not to be construed as being limited thereto. Various changes or modifications may be made to the embodiments without departing from the scope and spirit of the disclosure.

What is claimed is:

1. An electronic device, comprising:
   a cover comprising a display surface;
   a body comprising an upper surface and at least two sliding rails arranged at the upper surface for defining at least two sliding slots;
   an input device fixed to the upper surface;
   at least two sliding members engaging with the at least two sliding slots for rotatably and slidably coupling the cover to the body; and
   at least two latching members arranged at an end of the cover opposite to the at least two sliding members and slidably received in the cover;
   wherein the at least two sliding members are capable of being operated to slide along the at least two sliding slots from a first end to a second end, at the first end the cover is foldable with the body with the display surface covering the upper surface, and at the second end the cover is rotatable around the sliding member to cover the body with the display surface facing away from the upper surface, the at least two latching members are extendable out of the cover, and are insertable into the second end of the sliding rails to latch the cover to the body when the display surface is covering the upper surface, and are further insertable into the first end of the sliding rails to latch the cover to body when the display surface faces away from the upper surface.

2. The electronic device of claim 1, wherein the two sliding rails are parallel to each other and are arranged at two opposite rims of the upper surface.

3. The electronic device of claim 1, wherein each sliding member comprises a pivot rod rotatably received in the cover, a guiding post slidably received in the corresponding sliding slot, and a limiting portion joining the pivot rod to the guiding post, the width of the limiting portion is wider than that of the sliding slot, and the width of the guiding post is slightly narrower than that of the sliding slot.

4. The electronic device of claim 3, wherein the pivot rod and the guiding post are perpendicularly arranged at opposite sides of the limiting portion.

5. The electronic device of claim 1, further comprising at least two elastic elements corresponding to the at least two latching members, wherein each elastic element abuts against one of the corresponding latching member to drive the corresponding latching member extending out of the cover when the corresponding latching member is rest.

6. An electronic device, comprising:
   a body comprising an upper surface, the body defining at least two sliding slots, the at least two sliding slots disposed at two opposite ends of the upper surface, and the at least two sliding slots each comprising a first end and a second end opposite the first end;
   an input device fixed to the upper surface;
   a cover rotatably and slidably coupled to the body, the cover capable of being changed between a closed state and an opened state, and the cover comprising a first portion;
   at least two sliding members pivotally coupled to the cover and slidable along the at least two sliding slots, the at least two sliding members being configured to allow the cover to be in the opened state and being changed between a first state and a second state; and
   at least two latching members arranged at an end of the cover opposite to the at least two sliding members and slidably received in the cover;
   wherein in the first state the at least two sliding members are located at the first ends of the at least two sliding slots, cover is confined in the at least two sliding slots and covers on the upper surface with the first portion being exposed, and in the second state the at least two sliding members slide along the at least two sliding slots from the first ends to the second ends with the cover being rotatable relative to the body, the at least two latching members are extendable out of the cover, and are insertable into the second end of the sliding slots to latch the cover to the body when the first portion is covering the upper surface, and are further insertable into the first end of the sliding slots to latch the cover to body when the first portion faces away from the upper surface.

7. The electronic device of claim 6, wherein the first portion is a display.

8. The electronic device of claim 7, wherein the display is a touch-sensitive display.

9. The electronic device of claim 6, wherein each sliding member comprises a pivot rod rotatably received in the cover, a guiding post slidably received in the corresponding sliding slot, and a limiting portion joining the pivot rod to the guiding post, the width of the limiting portion is wider than that of the sliding slot, and the width of the guiding post is slightly narrower than that of the sliding slot.

10. The electronic device of claim 9, wherein the pivot rod and the guiding post are perpendicularly arranged at opposite sides of the limiting portion.

11. The electronic device of claim 6, further comprising at least two elastic elements corresponding to the at least two latching members, wherein each elastic element abuts against one of the corresponding latching member to drive the corresponding latching member extending out of the cover when the corresponding latching member is rest.

12. An electronic device capable of being used in a first manner and in a second manner, the electronic device comprising:
- a body comprising an upper surface, the body defining at least two sliding slots, the at least two sliding slots arranged at two opposite ends of the upper surface, and the at least two sliding slots each comprising a first end and a second end opposite the first end;
- a cover rotatably and slidably coupled to the body, the cover capable of being changed between a usable state and an unusable state;
- at least two sliding members pivotally coupled to the cover, wherein each sliding member comprises a pivot rod rotatably received in the cover, a guiding post slidably received in the corresponding sliding slot, and a limiting portion joining the pivot rod to the guiding post, the width of the limiting portion is wider than that of the sliding slot, and the width of the guiding post is slightly narrower than that of the sliding slot; when the cover is in the usable state, the at least two sliding members being configured to allow the cover to change between a first state and a second state;
- wherein when in the first state, the at least two sliding members are positioned at the first ends of the at least two sliding slots, the cover covers on the upper surface, and the electronic device is used in the first manner; and when in the second state, the at least to sliding members slide to the second ends of the at least two sliding slots with the cover uncovering on the upper surface, and the electronic device is used in a second manner, and the body further comprises a second input device, the second input device is fixed to the upper surface, and the second input device is operated to provide inputs to the electronic device when the electronic device is used in the first manner.

13. The electronic device of claim 12, wherein the cover is a touch-sensitive display, when the electronic device is used in the second manner, the touch-sensitive display is operated as a first input device to receive touch inputs.

14. The electronic device of claim 12, wherein the at least two sliding members are slidably received in the at least two sliding slots.

15. The electronic device of claim 12, wherein the pivot rod and the guiding post are perpendicularly arranged at opposite sides of the limiting portion.

16. The electronic device of claim 12, further comprising at least two latching members arranged at an end of the cover opposite to the at least two sliding members and slidably received in the cover, wherein the at least two latching members are extendable out of the cover and are insertable into one of the first end and the second end of the sliding slots to latch the cover to the body when the cover covers on the upper surface.

17. The electronic device of claim 16, further comprising at least two elastic elements corresponding to the at least two latching members, wherein each elastic element abuts against one of the corresponding latching member to drive the corresponding latching member extending out of the cover when the corresponding latching member is rest.

* * * * *